United States Patent
Ghannam et al.

(10) Patent No.: US 11,794,770 B1
(45) Date of Patent: Oct. 24, 2023

(54) SYSTEMS AND METHODS FOR HEARING IMPAIRED DRIVERS

(71) Applicant: Ford Global Technologies, LLC, Dearborn, MI (US)

(72) Inventors: Noha Ghannam, Canton, MI (US); Clara Bennie, Sterling Heights, MI (US); Cheri Hansen, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/807,001

(22) Filed: Jun. 15, 2022

(51) Int. Cl.
*B60W 50/14* (2020.01)
*B60W 40/09* (2012.01)
*B60W 40/08* (2012.01)

(52) U.S. Cl.
CPC ............ *B60W 50/14* (2013.01); *B60W 40/09* (2013.01); *B60W 2040/0872* (2013.01); *B60W 2050/146* (2013.01); *B60W 2540/30* (2013.01)

(58) Field of Classification Search
CPC ............... B60W 50/14; B60W 40/09; B60W 2040/0872; B60W 2050/146; B60W 2540/30
See application file for complete search history.

(56) References Cited

U.S. PATENT DOCUMENTS

| | | | |
|---|---|---|---|
| 8,842,021 B2 | 9/2014 | Behm et al. | |
| 10,255,816 B2 | 4/2019 | Bartel | |
| 11,492,005 B1 * | 11/2022 | Bond | B60W 40/02 |
| 2009/0254260 A1 * | 10/2009 | Nix | G01S 15/10 |
| | | | 348/148 |
| 2015/0061895 A1 * | 3/2015 | Ricci | B60K 28/00 |
| | | | 340/902 |
| 2019/0291639 A1 | 9/2019 | Hanson et al. | |
| 2020/0031362 A1 * | 1/2020 | Lee | B60W 50/14 |
| 2020/0066070 A1 * | 2/2020 | Wells | G07C 5/0833 |

OTHER PUBLICATIONS

Matthias Mielke, et al., An Assistive Technology for Hearing Impaired Persons: Analysis, Requirements and Architecture, 35th Annual International Conference of the IEEE EMBS, Osaka Japan, Jul. 3-7, 2013, 4702-4705.

* cited by examiner

*Primary Examiner* — Nabil H Syed
*Assistant Examiner* — Cal J Eustaquio
(74) *Attorney, Agent, or Firm* — Frank Lollo; Eversheds Sutherland (US) LLP

(57) ABSTRACT

The disclosure is generally directed to systems and methods for evaluating a driving environment of a vehicle for hearing impairment conditions, detecting a request related to hearing impairment conditions, activating an accessibility mode in response to the request based on the hearing impairment condition, the accessibility mode providing sensory aids in response to the hearing impairment conditions, and altering vehicle motion to enable driver attention to the driving environment. The detecting the request related to hearing impairment conditions includes receiving a driver request for accessibility, a predetermined setting implementing a driver profile indicating a request for accessibility, and an alert from a drivers assisted technology system using artificial intelligence (AI) that the driving environment has hearing impairment conditions. The alert from the DAT system includes analyzing behaviors of the driver including response times to environmental sounds and analyzing driver-chosen volume settings indicative of a hearing-impaired driver.

17 Claims, 5 Drawing Sheets

SYSTEMS AND METHODS FOR HEARING IMPAIRED DRIVERS

FIELD OF THE DISCLOSURE

This disclosure generally relates to vehicles, and more particularly relates to systems and methods to support hearing impaired drivers.

BACKGROUND

Vehicles with driver assistance features use artificial intelligence to detect environments and prevent accidents by predicting accidents and taking precautions. Driver assistance features do not typically relate to hearing impaired drivers. Moreover, hearing aids typically do not provide support for driving situations. Often, hearing-impaired situations are not permanent therefore hearing aids are unnecessary. For example, a temporary hearing loss due to recent flight, a loud environment and other situations that are not related to disabilities of a driver may arise while driving may be atypical but nonetheless of concern to drivers. Because driving environments change and drivers of vehicles also change over time, hearing-impaired conditions change and there is a need for vehicles to respond accordingly.

It is desirable to provide solutions that address hearing impaired drivers that take into account the driving environment.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
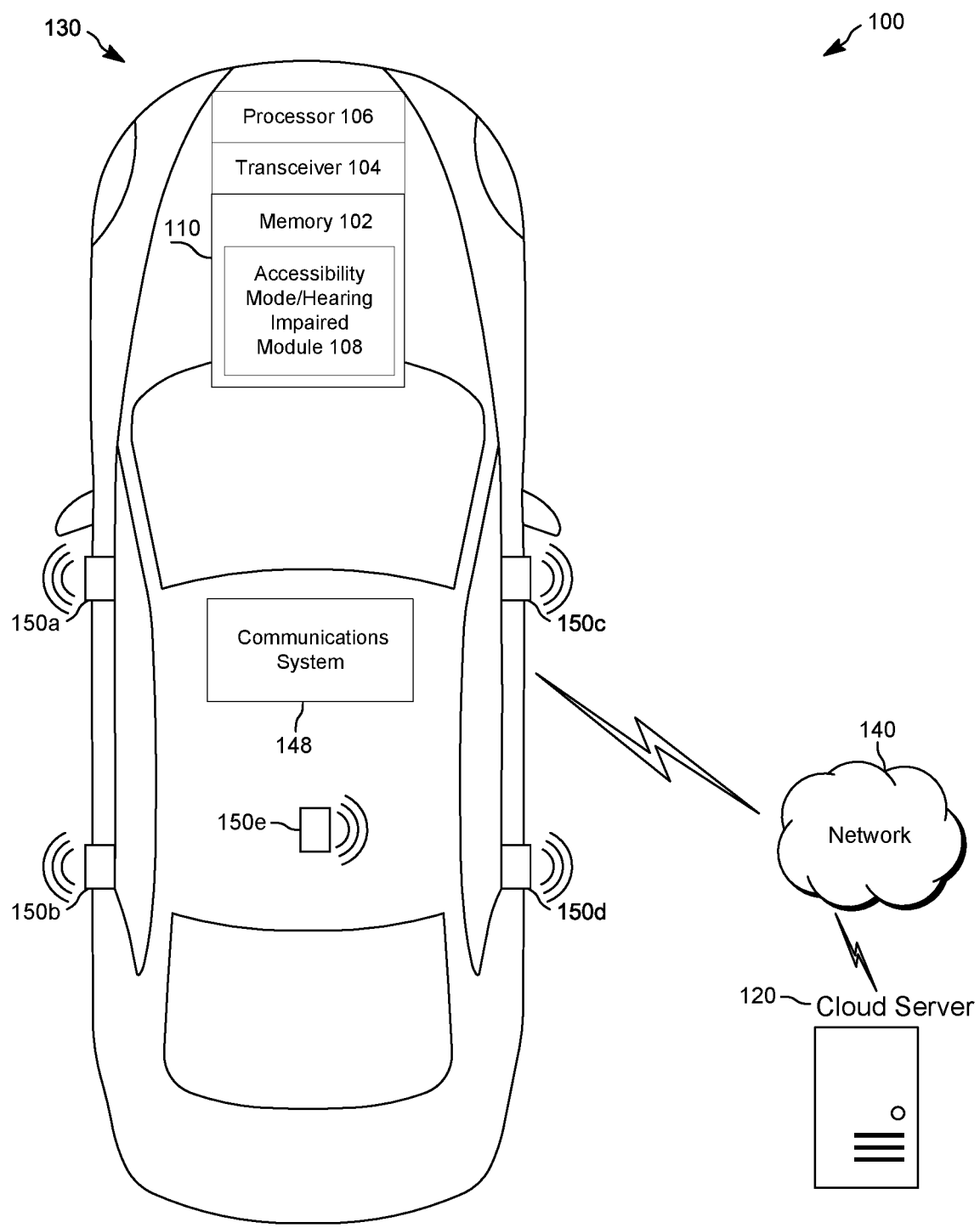
FIG. 1 illustrates an example system that includes a vehicle configured to enable driver accessibility features in accordance with and embodiment of the disclosure.

In terms of a general overview, this disclosure is generally directed to systems and methods for hearing impaired drivers. An example method includes evaluating a driving environment of a vehicle for hearing impairment conditions, detecting a request related to hearing impairment conditions, activating an accessibility mode in response to the request based on the hearing impairment condition, the accessibility mode including providing sensory aids in response to the hearing impairment conditions, and altering vehicle motion to enable driver attention to the driving environment.

In one or more embodiments, the detecting the request related to hearing impairment conditions includes receiving at least one of a driver request for accessibility, a predetermined setting implementing a driver profile indicating a request for accessibility, and an alert from a drivers assisted technology system using artificial intelligence (AI) that the driving environment has hearing impairment conditions.

In one or more embodiments, the alert from the driver assist technology (DAT) system includes analyzing behaviors of the driver including response times to audible condition, such as environmental sounds, and analyzing driver-chosen volume settings on vehicle devices indicative of a hearing-impaired driver.

In one or more embodiments, the altering vehicle motion to enable driver attention to the driving environment may include slowing the vehicle to enable driver attention to environmental cues, slowing the vehicle to a speed requiring hazard lights, engaging hazard lights on the vehicle, connecting with a network cloud server from the vehicle using, for example, vehicle to infrastructure communication, and transmitting an indication of activation of the accessibility mode.

Another embodiment is directed to a system for a vehicle, including a memory that stores computer-executable instructions and a processor configured to access the memory and execute the computer-executable instructions to evaluate a driving environment of the vehicle for hearing impairment conditions, detect a request related to hearing impairment conditions, activate an accessibility mode in response to the request based on the hearing impairment conditions, wherein the accessibility mode configured to provide sensory aids in response to the hearing impairment conditions, and alter vehicle motion to enable driver attention to the driving environment.

Another embodiment is directed to a cloud computing system for communicating with a vehicle including a memory that stores computer-executable instructions, a transceiver coupled to the memory, a processor configured to access the memory and execute the computer-executable instructions to receive a driving environment of the vehicle for hearing impairment conditions, detect a request related to hearing impairment conditions, and remotely activate an accessibility mode in response to the request based on the hearing impairment condition, the accessibility mode configured to alter vehicle motion to enable driver attention to the driving environment.

In one or more embodiments, the evaluating the driving environment of the vehicle for hearing impairment conditions further comprises an alert from a DAT system using artificial intelligence (AI) that the driving environment indicates hearing impairment conditions of the driver. The alert may indicate hearing impairment based on analysis of driver behaviors including response times to environmental sounds, and on analysis of driver-chosen volume settings on vehicle devices indicative of a hearing impaired driver.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternative implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

It should also be understood that the word "example" as used herein is intended to be non-exclusionary and non-limiting in nature. Furthermore, certain words and phrases that are used herein should be interpreted as referring to various objects and actions that are generally understood in various forms and equivalencies by persons of ordinary skill in the art. For example, the word "application" or the phrase "software application" as used herein with respect to a mobile device such as a smartphone, refers to code (software code, typically) that is installed in the mobile device. The code may be launched and operated via a human machine interface (HMI) such as a touchscreen. The word "action" may be used interchangeably with words such as "operation" and "maneuver" in the disclosure. The word "maneuvering" may be used interchangeably with the word "controlling" in some instances. The word "vehicle" as used in this disclosure can pertain to any one of various types of vehicles such as cars, vans, sports utility vehicles, trucks, electric vehicles, gasoline vehicles, hybrid vehicles, and autonomous vehicles. Phrases such as "automated vehicle," "autonomous vehicle," and "partially-autonomous vehicle" as used in this disclosure generally refer to a vehicle that can perform at least some operations without a driver being seated in the vehicle.

Driver assistance may apply to any of the levels of human intervention to assist a driver under different conditions. Many driver assistance techniques may be automated or requested by a driver. Embodiments herein relate to driver assistance techniques for hearing impaired drivers, and may include autonomous actions taken by the vehicle 130, such as Level 2 or 3 features.

With respect to autonomous action of vehicle 130, it is noted that the Society of Automotive Engineers (SAE) defines six levels of driving automation ranging from Level 0 (fully manual) to Level 5 (fully autonomous). These levels have been adopted by the U.S. Department of Transportation. Level 0 (L0) vehicles are manually controlled vehicles having no driving related automation. Level 1 (L1) vehicles incorporate some features, such as cruise control, but a human driver retains control of most driving and maneuvering operations. Level 2 (L2) vehicles are partially automated with certain driving operations such as steering, braking, and lane control being controlled by a vehicle computer. The driver retains some level of control of the vehicle and may override certain. Level 3 (L3) vehicles provide conditional driving automation but are smarter in terms of having an ability to sense a driving environment and certain driving situations. Level 4 (L4) vehicles can operate in a self-driving mode and include features where the vehicle computer takes control during certain types of equipment failures. The level of human intervention is very low. Level 5 (L5) vehicles are fully autonomous vehicles that do not involve human participation.

Many Americans suffer from hearing loss and a reported 16% of adults in the United States report hearing trouble. The National Institute on Deafness and Other Communication Disorders states "approximately one in three people in the United States between the ages of 65 and 74 has hearing loss, and nearly half of those older than 75 have difficulty hearing." As many as 40 million adults in America have noise-induced hearing loss. However, hearing aids generally have not helped drivers since many do not have a vehicle setting. Embodiments herein address the lack of accommodation for hearing impaired drivers.

FIG. 1 illustrates an example system 100. Vehicle 130 may be one of various types of vehicles such as a gasoline powered vehicle, an electric vehicle, a hybrid electric vehicle, or an autonomous vehicle, that is configured as a Level 2 or higher automated or semi-automated vehicle. The system 100 may be implemented in a variety of ways and can include various types of devices. For example, the example system 100 can include some components that are a part of the vehicle 130, and, in some embodiments, other components that are accessible via a communications network 140. The components that can be a part of the vehicle 130 can include a vehicle computer 110, and a wireless communication system in communication with the vehicle computer 110.

In one or more embodiments, vehicle 130 may be a fully networked environment (FNV). An FNV may be an electric vehicle or a partially electric vehicle that is networked to enable over the air (OTA) updates for systems and safety related applications and the like. In embodiments herein a vehicle may be connected with driver assist technology (DAT) that enhance the FNV capabilities and human to machine interfacing.

The vehicle computer 110 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in a blind spot, etc.). Vehicle computer 110 includes memory 102, transceiver 104 to enable communications, and processor 106.

The vehicle computer 110, in one or more embodiments, may be used to support features such as passive keyless operations, remotely controlled vehicle maneuvering operations, and remote vehicle monitoring operations. Vehicle computer 110, in one or more embodiments, may execute certain operations associated with hearing impaired environments and/or remote vehicle monitoring in accordance with the present disclosure. More particularly, vehicle computer 110 includes a memory 102, transceiver 104, processor 106, and an accessibility mode/hearing-impaired module 108 (hereinafter hearing-impaired module 108). While described herein as a module, i.e., a software module, it will be appreciated that the hearing-impaired module 130 as described herein may be implemented in logic or software associated with one of more functional aspects of the vehicle 130, and/or distributed among various components, as it is not necessary for the functionality of the hearing-impaired module 108 to be implemented by a dedicated module.

In embodiments, hearing-impaired module 108 provides instructions and actions for implementing the accessibility mode and preferences as well as provide information for DAT as more fully detailed below. As described below, the accessibility mode may invoke algorithms stored in memory 102 in association with other components of the vehicle 130, such as sensors, cameras, vehicle controls (braking, speed, etc.), interior and exterior lighting, infotainment systems, etc., and may be instantiated by the hearing-impaired module 108 for executing the accessibility mode when it is determined a driver is hearing impaired.

A communication system 148 of vehicle 130, which may be part of the Computer 110, may include a set of wireless communication nodes and/or sensors 150a, 150b, 150c, 150d and 150e mounted upon vehicle 130 and within vehicle 130 in a manner that allows the vehicle computer 110. These sensors may enable communication with a cloud network 120 accessible through a network connection 140. Examples of communication nodes 150a, 150b, 150c and 150e may include sensors and/or emitters capable of detecting objects and distances and may include ultrasonic radar, LiDAR, cameras, microphones, and the like. In one or more embodiments, communications nodes 150a, 150b, 150c, 150d and 150d may further include one or more of Bluetooth®-enabled sensors, or Bluetooth® low energy (BLE)-enabled sensors. Further, in one or more embodiments, communication node data may be enhanced or substituted with cloud-based network data communicated to vehicle 130. In an alternative implementation, a single communication node and/or sensor 150e may be mounted upon the roof of the vehicle 130. Other sensors may also be present in vehicle 130 including wheel speed sensors, accelerometers, rate sensors, GPS sensors, and steering wheel sensors with haptics.

The communication system 148 may use one or more of various wireless technologies such as Bluetooth®, Ultra-Wideband (UWB), Wi-Fi, ZigBee®, Li-Fi (light-based communication), audible communication, ultrasonic communication, near-field-communications (NFC), Bluetooth® low energy (BLE) and the like, for carrying out wireless communications with devices such as a cloud server 120 via one or more sensors 150a-150e.

The vehicle computer 110, as a fully networked vehicle (FNV) in certain embodiments, may connect to cloud server 120 via communications network 140. The communications network 140 may include any one network, or a combination of networks, such as a local area network (LAN), a wide area network (WAN), a telephone network, a cellular network, a cable network, a wireless network, and/or private/public networks such as the Internet. For example, the communications network 140 may support communication technologies such as TCP/IP, Bluetooth®, Bluetooth Low Energy (BLE), cellular, near-field communication (NFC), Wi-Fi, Wi-Fi direct, Li-Fi, acoustic or ultrasonic audio communication, Ultra-Wideband (UWB), machine-to-machine communication, and/or human-to-machine communication.

In one or more embodiments, communications network 140 may include a cloud-based network or source for transferring data to remotely activate the accessibility mode via the hearing-impaired module 108 in the vehicle 130, in accordance with this disclosure. Hearing-impaired module 108, which allows a user to request accessibility mode for performing operations such as, for example, monitoring a driver environment to take actions performed autonomously by the vehicle 130. One example of an action performed autonomously or semi-autonomously by the vehicle 130 may include implementation of an accessibility mode by the hearing-impaired module 108 for hearing impaired drivers and include actions that provide a display of noises in the environment, such as a notice that emergency vehicle sirens should be heard, display of directions for GPS location services, haptic feedback for other signals representing noises, and other personalized haptic feedback. For example, it may be determined by user input or AI that a driver has right sided deafness, and the hearing-impaired module 108 will cause the displays and haptic feedback may concentrate on sounds from the right side of vehicle 130.

Other actions that a hearing-impaired module 108 may autonomously or semi-autonomously instantiate may include lowering vehicle sounds related to a radio, fans and other non-essential vehicular functions that generate interior sounds, display warnings for vehicle diagnostic needs, and provide an enhanced field of view based on vehicular cameras, and alert passengers.

More specifically, in one or more embodiments, hearing-impaired module 108, may be located within vehicle computer 110 and accessible to network 140 via one or more of the first set of wireless communication nodes 150a, 150b, 150c, 150d and 150e which may communicate with cloud server 120 to provide additional over-the-air actions to assist a hearing-impaired driver. For instance, navigation information, road work, school zones, accident reports, and more may be communicated to the hearing-impaired module 108 of the vehicle from the server 120 to enhance implementation of an accessibility mode customized for the hearing-impaired driver and/or the route of the vehicle 130.

In one embodiment, a driver of vehicle 130, may initiate the accessibility mode under control of the hearing-impaired module 108 in vehicle 130. During an accessibility mode procedure, the vehicle 130 may then implement accessibility displays and actions such as slowing down vehicle 130 or the like.

In another case, the vehicle 130 can be a L2 level vehicle does not require driver interaction but detects hearing impairment conditions without human assistance. In one or more embodiments, hearing impairment module 108 interacts with control systems to detect and respond to hearing impaired conditions.

Figure 2:
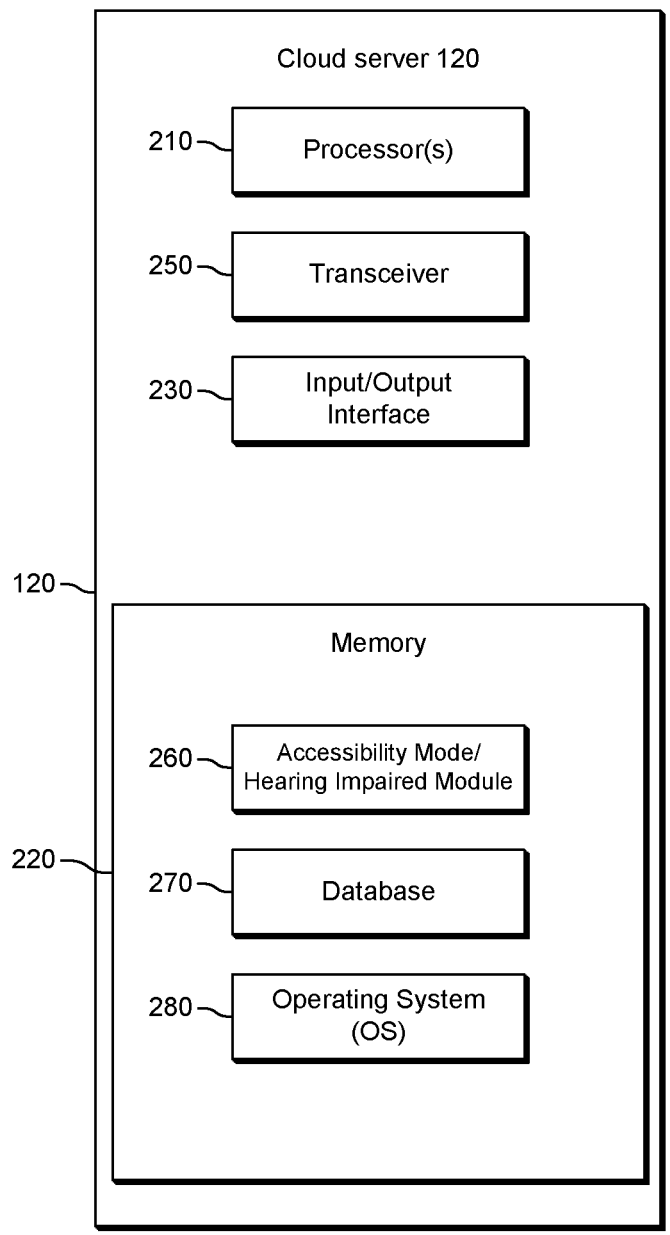
FIG. 2 illustrates some example functional blocks that may be included in a cloud server system appropriate for aiding hearing-impaired drivers in accordance with an embodiment of the disclosure.

FIG. 2 illustrates some example functional blocks that may be included a cloud network server 120 in accordance with an embodiment of the disclosure. The functional blocks of the cloud network 120 may include a processor 210, memory 220, an input/output (I/O) interface 230, transceiver 250, accessibility mode/hearing impairment module 260 (hereinafter hearing-impairment module 260), database 270, and an operating system (OS) 280. The operating system 280 can be any of various kinds of software used for operating cloud network server 120 such as, for example, a Windows® operating system.

In one or more embodiments, the hearing impairment module 260 enables remote control of a vehicle after detecting a hearing impairment environment. One example of a remote-control software application is FordPass™ and may be used to carry out various remote-control operations such as, for example, limiting speed of vehicle 130, and automatically providing alerts and displays associated with vehicle operation.

In one or more embodiments, hearing impairment module 260 operates to carry out various actions for assisting. For example, transceiver 250 can include a wireless transmitter and/or a wireless receiver that is used to communicate with a transceiver 104 in the vehicle 130 to establish communications and monitor or establish accessibility mode for hearing impaired driving. The transceiver 250 may be coupled to various components in the vehicle 130, such as, for example, a fully networked vehicle (FNV) system for in-vehicle communications (displaying messages, providing warnings, etc.) and in some embodiments also be coupled to communication nodes and sensors 150*a*, 150*b*, 150*c*, 150*d* and 150*e*.

The computer 110 in vehicle 130 may be configured to operate in cooperation with the hearing-impaired module 260 and hearing impaired module 108 to execute various operations associated with hearing impairment conditions for vehicle 130 by transmitting vehicle 130 information over network 140 to ensure that accessibility mode is instantiated when necessary in accordance with one or more embodiments.

The memory 220, which is one example of a non-transitory computer-readable medium, may be used to store the operating system (OS) 280, database 270, and various modules such as the hearing impaired module 260. One or more modules in the form of computer-executable instructions may be executed by the processor 210 for performing various operations in accordance with the disclosure. More particularly, hearing impaired module 260 may be executed by the processor 210 alone or in coordination with the hearing-impaired module 108 to enable the accessibility mode for carrying out various hearing-impaired related operations on the vehicle 130 (display, limiting speed, haptic feedback, etc.). The hearing impairment module 260, in one or more embodiments, may be executed for performing in accordance with the disclosure.

Figure 3:
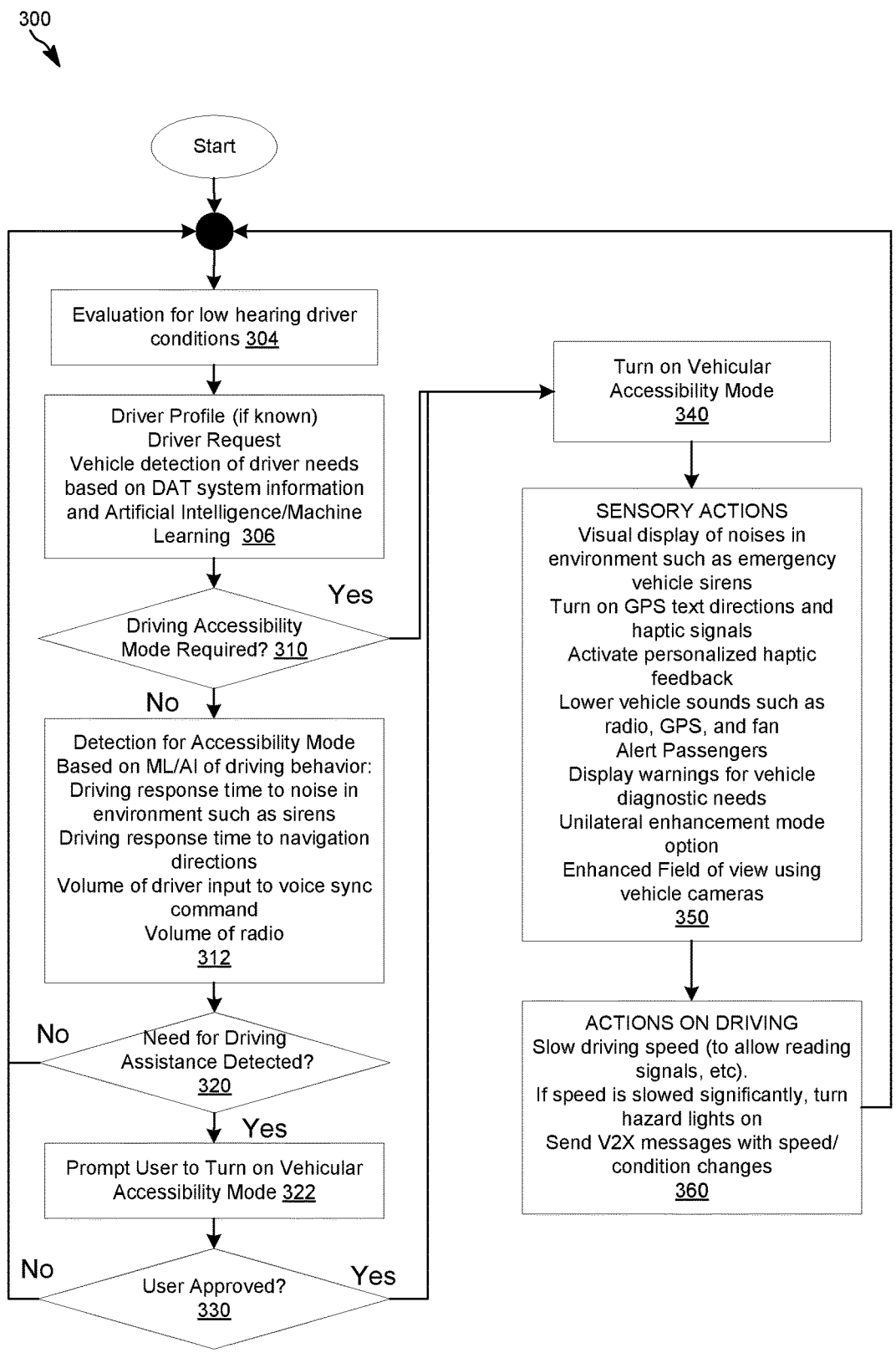
FIG. 3 illustrates a decision flow diagram illustrating a method in accordance with an embodiment of the disclosure.

Referring now to FIG. 3, a decision flow diagram illustrates a method for determining actions for an accessibility mode. The method begins with initiating an evaluation for low hearing driver conditions at block 304. For example, if a fully networked vehicle 130 includes sensors and cameras that are fully networked, conditions may be determined related to determining if a hearing-impaired environment is present. Block 306 provides for determining if a driver profile exist that identifies the driver as hearing impaired exists, if the driver requests accessibility mode for hearing impaired, or is the vehicle previously detected the driver needs based on DAT system information or artificial intelligence or machine learning that dictates that an accessibility mode should be implemented.

Decision block 310 asks whether driving accessibility mode is required based on the actions of block 306. If yes, then the vehicular accessibility mode is activated at block 340. If not, then block 312 provides for detecting for accessibility mode based on machine learning or artificial intelligence determined driving behavior. For example, as shown at block 312, driving response time to noise in the environment such as sirens, driving response time to navigation directions, and volume of driver input to voice synchronization commands and the volume of the radio may be considered in determining whether or not an accessibility mode should be activated.

In accordance with embodiments, decision block 320 provides for determining if a need for driving assistance is detected. If no, then the decision flow goes back to start at lock 304, and if yes, then the decision flow proceeds to block 322 prompting the user to turn on the accessibility mode. Decision block 330 determines if the driver is approved for the accessibility mode of the hearing-impaired module 108. If yes, then block 340 provides for turning on the accessibility mode. If no, then the decision flow returns to block 304.

If the accessibility mode is activated, then block 350 and block 360 provide for actions to be taken by the hearing-impaired module 108 as a part of activation of the accessibility mode. Specifically, block 350 provides for taking sensory actions for a driver such as displaying visually noises in the environment, like emergency vehicle sirens, displaying GPS text directions and haptic signals, activating personalized haptic feedback, lowering vehicle sounds, like a radio, GPS, fans, alerting passengers, displaying warnings for vehicle diagnostic needs, and providing a unilateral enhancement mode. Block 350 further includes providing an enhanced field of view using vehicle cameras to provide drivers with a wider area of visibility. The actions taken with regard to block 350 may be automatic via a FNV or as part of a driver's choice to request accessibility mode. For example, hearing impaired module 108 with or without input from cloud server 120 may interact with vehicle components as part of the accessibility mode. If in a self-driving mode of vehicle 130 or in communication with and hearing-impaired module 260 of the cloud server 120, actions may be taken automatically as part of the accessibility mode.

Block 360 provides for actions taken affecting driving, such as automatically slowing driving speed to allow for reading signals and signs. If the speed is slowed significantly, the accessibility mode may turn hazard lights on for the vehicle. Further, block 360 provides for sending a vehicle to infrastructure (V2X) message with speed and condition changes. For example, a message could be sent to other vehicles directly or the cloud server 120 for distribution to other vehicles of authorities.

Figure 4:
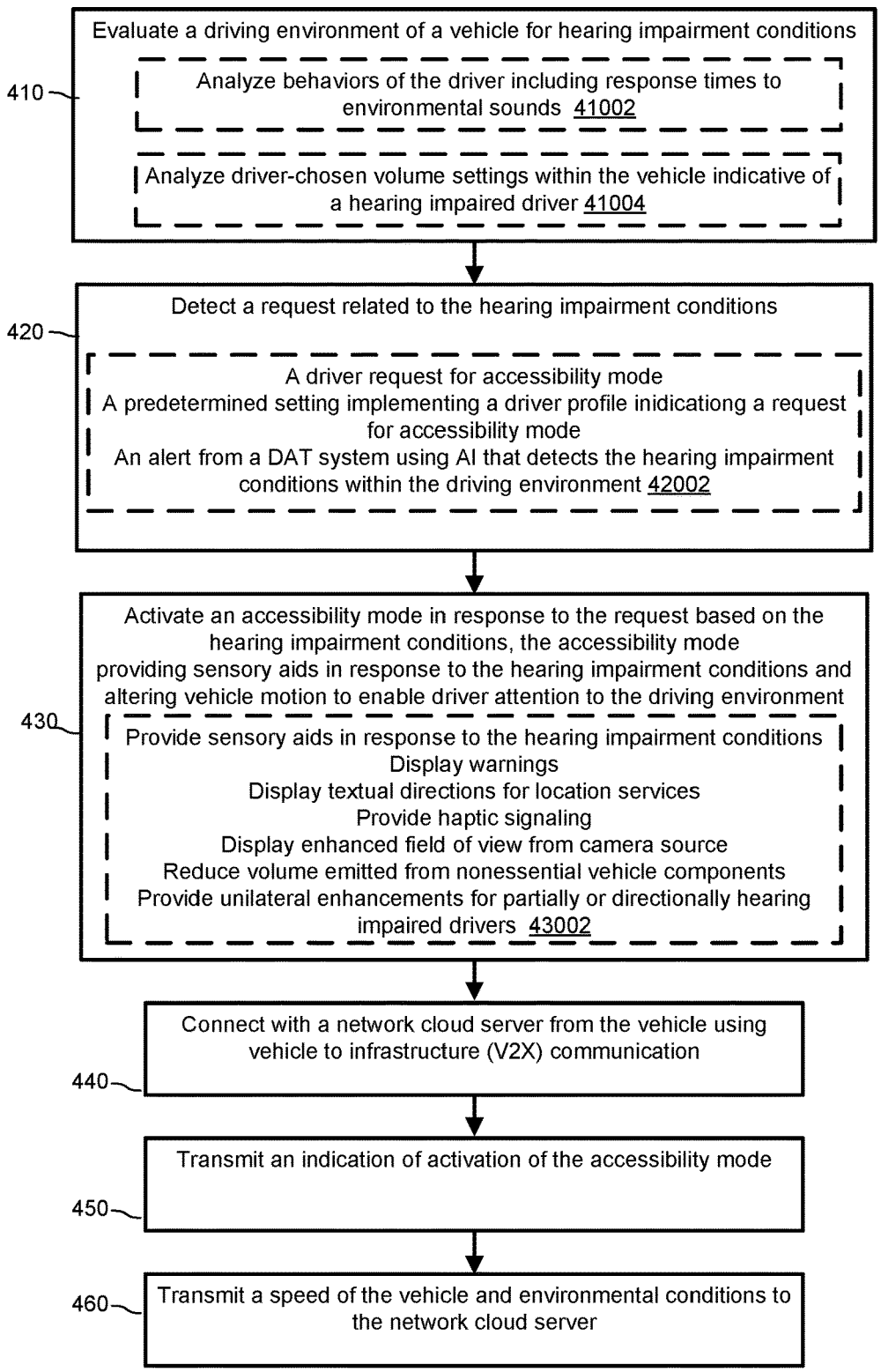
FIG. 4 illustrates an exemplary flow diagram of a method in accordance with an embodiment of the disclosure.

Referring now to FIG. 4, a flow diagram 400 illustrates a method in accordance with an embodiment. Block 410 provides for evaluating a driving environment for hearing impairment conditions. For example, sensors and cameras 150 within and outside vehicle 130 may sense an environment around vehicle 130 to identify weather conditions, sense noises using microphones and the like. Within block 410 is optional block 41002 providing for analyzing behaviors of the driver including response times to audible conditions, such as environmental sounds. For example, vehicle 130 sensors may detect if a driver is slow to respond to noises, sirens, train signals and the like. Optional block 41004 provides for analyzing driver-chosen volume settings within the vehicle indicative of a hearing-impaired driving. For example, if a driver has volume settings that are at a high setting because the driver cannot hear.

Block 420 provides for detecting a request related to the hearing impairment conditions. Optional block 42002 provides for optional methods of detecting a request. One can be a driver request for accessibility mode. For example, hearing impaired module 108 may include instructions for an accessibility mode for hearing impaired driving. Another request may be a predetermined setting implementing a driver profile indicating a request for accessibility mode. For example, if a vehicle has multiple drivers and each has their own profile, each of the actions 350 and 360 shown in FIG. 3 may be part of a driver chosen profile. Block 42002 further includes an alert from a DAT system using artificial intelligence to detect the hearing impairment conditions within the driving environment. For example, sensors 150 and cameras within vehicle 130 may detect different activities indicative of a hearing issue and use machine learning to identify, detect and request accessibility mode.

Block 430 provides for activating accessibility mode in response to the request based on the hearing impairment conditions, the accessibility mode providing sensory aids in response to the hearing impairment conditions and altering vehicle motion to enable driver attention to the driving environment. For example, hearing-impaired modules, 108 within vehicle 130, hearing impaired module 260 in cloud server 120 may activate an accessibility mode in response to a request. Optional block 43002 provides for providing sensory aids in response to the hearing impairment conditions. Such sensory aids includes display warnings, displaying textual directions for location services, haptic signaling, enhanced field of view from camera sources, reduced volume emitted from nonessential vehicle components, unilateral enhancements for partially or directionally challenged hearing impaired drivers.

Block 430 also provides for altering vehicle motion to enable driver attention. Which may include slowing the vehicle to increase the response time available to respond to environmental cues, and to enable driver attention to environmental cues, such as slowing the vehicle to a speed requiring hazard lights and engaging hazard lights on the vehicle. For example vehicle 130 may receive instructions over network 140 or directly from vehicle computer 110 to slow vehicle 130 and turn on hazard lights based on machine learning data or the like.

Block 440 provides for connecting with a network cloud server from the vehicle using vehicle to infrastructure (V2X) communication. For example, vehicle 130 may connect to cloud server 120 using V2X communication in a normal driving state as a FNV that enables hearing impaired module 260 to monitor vehicle 130 for the need to automatically implement sensory aids and to slow vehicle 130 to increase the response for the driver to respond, as needed. Data received over cloud server 120 may come from other locations and cameras and sensors in an environment to assist a driver of vehicle 130, for example. Block 450 provides for transmitting an indication of activation of the accessibility mode. For example, in V2X communication, hearing impaired module 260 may communicate with vehicle 130 an alert that accessibility mode is recommended or detected as necessary or the like. Block 460 provides for transmitting a speed of the vehicle and environmental conditions to a network cloud server. For example, once an accessibility mode is implemented or requested, the V2X communication may transmit ongoing speeds of vehicle 130 and volume settings, and driving styles of a driver.

Figure 5:
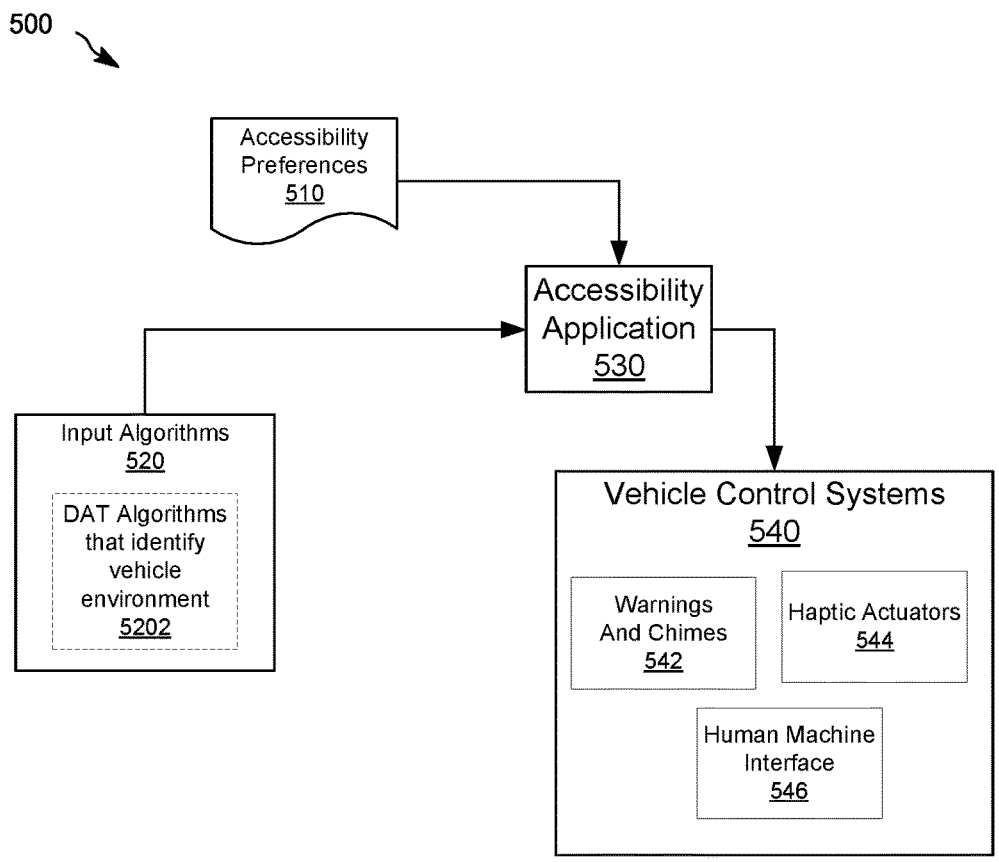
FIG. 5 illustrates a decision flow diagram for a fully networked vehicle (FNV) with access to driver assist technologies (DAT) in accordance with an embodiment of the disclosure.

Referring now to FIG. 5, a data flow diagram illustrates how a FNV overlay may implement one or more embodiments. As shown, accessibility preferences 510 may be stored in either cloud server 120 or within vehicle 130, such as within memory 102 and accessible to hearing-impaired module 108. FIG. 5 also illustrates input algorithms 520 such as DAT algorithms that identify vehicle environments 5202. Input algorithms 520 may also be stored in cloud server 120 or vehicle computer memory 102. Both accessibility preferences 510 and algorithms 520 are provided to accessibility application 530, which could be stored in memory 102 or in cloud server memory 220. The hearing-impaired module 108 and/or hearing-impaired module 260 may include an accessibility application 530. Once instantiated, application 530 affects vehicle 130 control systems by interacting with vehicle control systems, as shown in block 540. Control systems in FNV may include chimes and warnings, 542, haptic actuators, 544 and human machine interfaces 546. More particularly, control systems 540 may implement machine learning and artificial intelligence algorithms that attempt to interpret driver behavior when in the accessibility mode to assist hearing impaired drivers. For example, vehicle 130 control systems may use sensors 150, which may further include wheel speed sensors, accelerometers, rate sensors, GPS, and steering wheel sensors, and cameras within vehicle 130 to monitor drivers and passengers. Such monitoring captured by a camera of vehicle 130 may assist in analyzing behaviors.

Analyzing behaviors becomes more important when a driver may be only temporarily hearing impaired. For example, if a driver is in a loud environment, or recently experienced a hearing impairment, such as just getting off a long flight, a recent music concert causing tinnitus, or recently participating in firearms/hunting activities, a hearing impairment may be present. In such times, a driver may request accessibility mode. Also, a driver may not realize she is hearing impaired, but machine learning and artificial intelligence algorithms, such as DAT algorithms 520, may detect a temporary condition and recommend an accessibility mode. For example, in one or more embodiments, vehicle 130 includes machine learning trained to detect the speed of vehicle 130 from captured video. For example, a hearing impairment module installed on vehicle computer 110 will be able to determine vehicle speed, and vehicle orientation within a hearing impairment environment and be able to automatically lower the speed of the vehicle.

Figure 6:
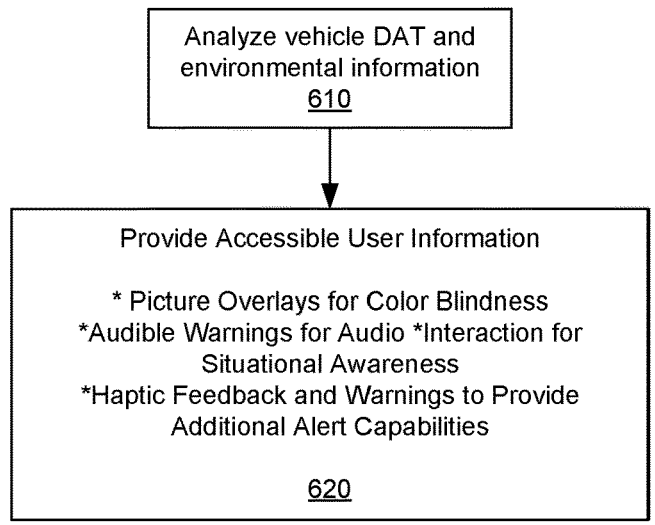
FIG. 6 illustrates a flow diagram of a method for a fully networked vehicle with DAT environmental sensing in accordance with an embodiment of the disclosure.

Referring to FIG. 6, a flow diagram illustrates a method in accordance with an embodiment of the disclosure. As shown, block 610 provides for analyzing vehicle DAT and environmental information, such as information collected by sensors 150a-150e and form the cloud server 120, by the hearing-impaired module 108 or 260. For example, hearing-impaired module 108 may receive data form sensors 150a-150e or various controls system within the vehicles 130, or from the hearing-impaired module 260 over network 140, and collected and stored data in memory 102 in vehicle 130 for processing by the hearing-impaired module 108.

Block 620 relates to providing accessible user information. For example, after hearing-impaired modules 108 and 260 may process and analyze data received and stored, and provide user information to the driver in a different way. As shown in block 620, such methods can include providing picture overlays for color blindness, audible warnings for audio, interactions for situational awareness, haptic feedback and warnings to provide additional alert capabilities.

Referring back to FIG. 1 in combination with FIG. 4, a system in accordance with an embodiment includes vehicle computer 110 with memory 102 that stores computer-executable instructions, transceiver 104 and processor 106 configured to access the memory and execute the method illustrated in flow diagram shown in FIG. 4, as well as those of FIGS. 3, 5 and 6. For example, the system enables processor 106 to instantiate hearing impaired module 108, which can initiate an accessibility mode module for any disability. Likewise, hearing impaired module 260 may also instantiate an accessibility mode over network 140 and interact with vehicle 130. Once instantiated, the hearing-impaired module may estimate of the speed, behaviors of a driver of vehicle 130, and result in FNV and DAT information recommending accessibility mode.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," "example implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described. For example, various features, aspects, and actions described above with respect to an autonomous parking maneuver are applicable to various other autonomous maneuvers and must be interpreted accordingly.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, mobile devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   initiating, by a vehicle, a hearing-impaired accessibility mode;
   determining a hearing impairment condition in a proximity of the vehicle;
   determining, based on the hearing impairment condition, a sensory aid to be provided by the vehicle;
   providing the sensory aid to address in real time the hearing impairment conditions;
   alter vehicle motion to enable driver attention to a driving environment;
   connecting with a network cloud server by the vehicle using vehicle-to-infrastructure communication;
   transmitting an indication of providing of the sensory aid; and
   transmitting a speed of the vehicle and environmental conditions to the network cloud server.

2. The method of claim 1 wherein initiating a hearing-impaired accessibility mode further comprises determining at least one of:
   a driver request for accessibility mode;
   a predetermined setting implementing a driver profile indicating a request for accessibility mode; or
   an alert from a driver assisted technology (DAT) system using artificial intelligence (AI) that determines a hearing impairment of the driver.

3. The method of claim 2 wherein the alert from the DAT system further comprises one or more of:
   analyzing response times of the driver to audible conditions; or
   determining driver-chosen volume settings on vehicle devices are indicative of a hearing impaired driver.

4. The method of claim 1 further comprising slowing the vehicle to increase recognition time of environmental cues.

5. The method of claim 4 wherein the slowing of the vehicle, further comprises:
   slowing the vehicle to a speed requiring hazard lights; and
   engaging hazard lights on the vehicle.

6. The method of claim 1 wherein providing the sensory aids further comprises one or more of:
   providing a visual display of environmental cues including noises in the proximity of the vehicle;
   providing display of textual directions for location services;
   activating haptic signaling supportive of hearing impaired driving;
   providing alerts to passengers of the vehicle of potentially dangerous hearing impairment conditions;
   displaying an enhanced field of view from a vehicle-mounted camera; or
   reducing volume emitted from nonessential vehicular components.

7. The method of claim 1 wherein providing the sensory aids further comprises
   providing unilateral enhancements for partially or directionally hearing impaired drivers.

8. The method of claim 1 wherein initiating a hearing-impaired accessibility mode further comprises one or more of:
   analyzing behaviors of the driver including response times to environmental sounds; determining driver-chosen volume settings within the vehicle are indicative of a hearing impaired driver; or
   determining to initiate the hearing-impaired accessibility mode.

9. A system for a vehicle comprising:
   a memory that stores computer-executable instructions;
   a processor configured to access the memory and execute the computer-executable instructions to:
      detect a hearing impairment condition in a driving environment of a vehicle; and
      activate, based on detecting the hearing impairment condition, an accessibility mode, the accessibility mode configured to:
         provide sensory aids to an occupant of the vehicle; and
         alter vehicle motion to enable driver attention to the driving environment; and
   a transceiver coupled to the processor, the transceiver configured to:
      connect with a network cloud server by the vehicle using vehicle-to-infrastructure communication;
      transmit an indication of activation of the accessibility mode; and
      transmit a speed of the vehicle to the network cloud server.

10. The system of claim 9 wherein the processor is further configured to access the memory and execute the computer-executable instructions to determine to active the sensory aids, the determination based on at least one of:
    a driver request for accessibility mode;
    a predetermined setting implementing a driver profile indicating a request for accessibility mode; and
    an alert from a driver assisted technology (DAT) system using artificial intelligence (AI) that detects hearing impairment conditions within the driving environment.

11. The system of claim 10 wherein the alert from the DAT system is based on at least one of analysis of driver response times of a driver to environmental sounds, or determining driver-chosen volume settings on vehicle devices are indicative of a hearing-impaired driver.

12. The system of claim 9 wherein the processor is further configured to access the memory and execute the computer-executable instructions to slowing the vehicle to increase recognition time of environmental cues.

13. The system of claim 9 further comprising:
    a visual display configured to display one or more of environmental cues of noises in the driving environment of the vehicle, textual directions for location services, or enhanced field of view camera-generated video.

14. The system of claim 9 wherein the processor is configured to access the memory and execute the computer-executable instructions to activate an accessibility mode in response to the request based on the hearing impairment condition, the accessibility mode including sensory aids to activate haptic signaling supportive of hearing-impaired driving and alert passengers of the vehicle of potentially dangerous hearing impairment conditions.

15. The system of claim 14 wherein the accessibility mode is further configured to:
    display warnings for vehicle diagnostic needs; and provide unilateral enhancements for partially or directionally deaf drivers.

16. A system for a communicating with a vehicle comprising:
- a memory that stores computer-executable instructions;
- a transceiver coupled to the memory;
- a processor configured to access the memory and execute the computer-executable instructions to:
  - receive an indication of a driving environment of the vehicle being associated with hearing impairment conditions;
  - receive a request related to hearing impairment conditions; and
  - remotely activate an accessibility mode in response to the request, the accessibility mode configured to alter vehicle motion to enable driver attention to the driving environment; and
- a transceiver coupled to the processor, the transceiver configured to:
  - connect with a network cloud server by the vehicle using vehicle-to-infrastructure communication;
  - transmit an indication of activation of the accessibility mode; and
  - transmit a speed of the vehicle to the network cloud server.

17. The system of claim 16 wherein the processor configured to access the memory and execute the computer-executable instructions to receive the driving environment includes an alert from a driver assisted technology (DAT) system using artificial intelligence (AI) that detects hearing impairment conditions within the driving environment based on analysis of driver behaviors including response times to environmental sounds, and analysis of driver-chosen volume settings on vehicle devices indicative of hearing -impaired driving.

* * * * *